United States Patent Office 2,942,198
Patented June 21, 1960

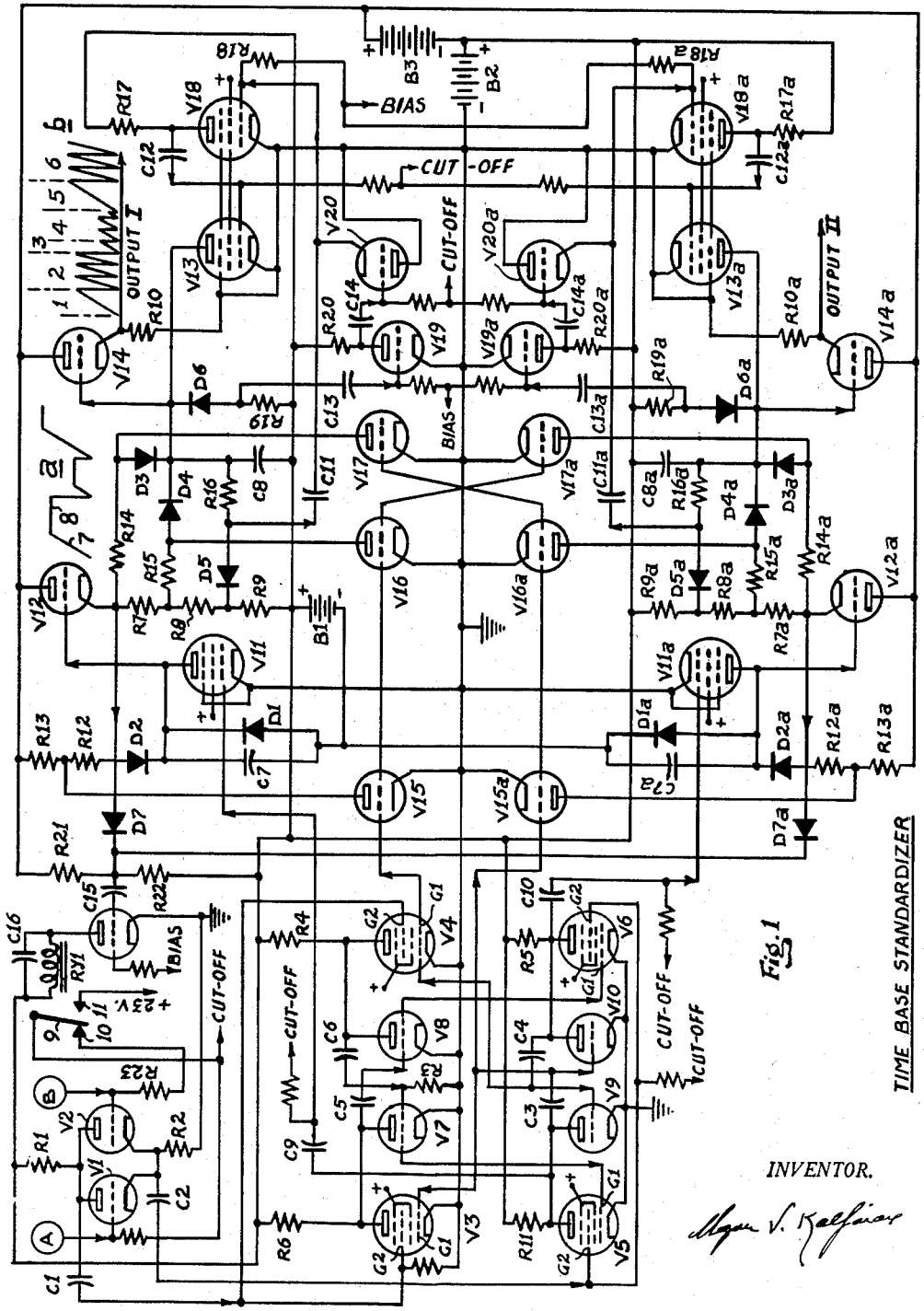

2,942,198
SYSTEM OF TIME BASE STANDARDIZATION
Meguer V. Kalfaian, 65 E. 96th St., Los Angeles, Calif.
Filed Nov. 10, 1958, Ser. No. 773,064
5 Claims. (Cl. 328—185)

This invention relates to generation of time base waves, and particularly to a system for transposing variable time base waves of unknown waves to standard time base waves. The main object of the present invention is to translate electrically increasing quantities having variable time base periods to equally defined electrically increasing quantities having a standard time base period.

In certain electronic applications it may be desired that a complex waveform recorded at an unknown time base period, be reproduced at a standard time base period. For example, a certain complex waveform may be known to have a definite number of wave components. It is possible that this complex waveform is originated from a source in different time durations. Although the original shape of the complex waveform is assumed to be preserved, the frequency positions of said definite number of wave components will be shifted to different regions according to the time period in which the complex waveform is produced. In order to provide a concrete analysis of the frequency components of said complex waveform, it is necessary that the arriving waveform is first recorded during a normal time base period, and reproduce it during a standard time base period. The frequency positions of different wave components of the complex waveform will then be shifted to a standard region for precise analysis. In one mode of operation, the incoming waveform may be recorded within part of a standard time base period, and stretching the waveform to a standard length by slowing the reproduction speed proportionally. When these complex waveforms arrive repeatedly, however, it is then necessary to assign a standard time base having a time period less than the shortest time period occurring in said complex waveforms. In this case, and according to the invention, the incoming complex waveforms are recorded and reproduced in first and second recording devices in alternate sequence, under control of first and second time base standardizing wave generators, respectively. The operation is such that, while the first recording is processed, its time length (from inception to termination of the complex waveform) is measured and stored in the form of a first signal quantity. Then, while the second recording is processed, the first recorded waveform is reproduced under control of the first quantity, so adjusted that the first recorded waveform is reproduced in the said standard time base period. In order to allow time for reproduction of the recorded waveform prior to the arrival of a successive wave pattern, the standard time base period is adjusted to be shorter than the shortest time base period occurring in the arriving complex waveforms. Thus the number of reproduced waveforms will be more than the actual recorded waveform, which condition is more advantageous for more accurate analysis of the frequency components of each of the incoming complex waveforms.

A detailed description of the system contemplated herein will be given in the following specification, with reference to the schematic arrangement of Fig. 1.

In reference to Fig. 1, the graphical wave forms shown at $a$ and $b$ illustrate how the varying time base periods are changed into a standard time base period. For example, referring to the waves at $b$, the first saw tooth wave 1 represents the recording time base wave. When this time base wave terminates, the reading time base waves in the area 2 commence immediately. It will be noted that the reading time base periods are shorter than the recording time base periods; the former of which is represented as the standard reading time base period. It will also be noted that the amplitude of the reading time base wave is equal to the amplitude of the recording time base wave. During the recording time period of 3, the incoming complex waveform may terminate when the amplitude of the time base wave is very low, such as illustrated. In this case again, the reading time base waves commence immediately in area 4, starting at said termination. The amplitude of the reading time base waves in area 4 is now equal to the amplitude of the recording time base wave 3; the former being produced in the standard time base periods. The recording time base wave 5 is another example, wherein, the incoming complex waveform occupies the full recording time period. When the wave 5 terminates, the reading time base waves in the area 6 commence immediately, with the standard time base periods aforesaid. Thus it will be seen that the reading of any recorded complex waveform will always have the same time base period. The circuit arrangement of Fig. 1 is divided into two similar branches, having output I and output II. The time base waves produced at output II are not shown in the drawing, but the sequence of these waves will be such that, during production of the recording time base wave 1, at output I, the output II will assume production of reading time base waves, and thereby creating an alternate operating condition. The waveform illustrated at $a$ will be helpful in describing the function of the circuit arrangement of Fig. 1.

Referring now to Fig. 1, it is first assumed that marker pulses may be produced at the arrival of each incoming complex waveform. This is described in a disclosure of my U.S. Patent Number 2,673,893, March 30, 1954. Usually these pulses are produced at the output of a flip-flop trigger circuit, which inherently divides the frequency of the produced pulses by two, due to the reason that the output pulses are produced alternately in first and second output branches. Assuming then, that these pulses are produced alternately in first and second branches, they are first combined in the output of a single-ended circuit comprising vacuum tubes V1 and V2. The control grids of these tubes are highly negative biased to anode current cut-off, as indicated in the drawing. Any one of these control grids receiving a positive pulse from source terminals (A) or (B), an anode current causes a negative pulse developed across anode circuit resistor R1, and a positive pulse developed across cathode circuit resistor R2. These simultaneously produced negative and positive pulses are then applied upon the parallel connected second control grids G2 of tubes V3, V4, and the parallel connected second control grids G2 of tubes V5, V6, respectively, through coupling capacitors C1 and C2. These latter tubes constitute a flip-flop trigger circuit in combination with the tubes V7 to V10; the function of which may be described as in the following:

*Flip-flop circuit*

Assume initially that the plate supply potential is switched on upon the tubes V9 and V10. The unloaded storage capacitors C3 and C4 will charge to the maximum of plate supply potential, through grid to ground conductance of these tubes. Due to cross coupling between the grids of tubes V9 and V10, and due to inevitable unbalance between the two sections, one tube will conduct in greater magnitude and apply regenerative cut-off negative bias upon the control grid of the other tube; thus effecting stable conducting and non-conducting state of the tubes V9 and V10. The same operating condition relates to the tubes V7 and V8, by way of their similar cross couplings through storage capacitors C5 and C6. Actually, the function of these capacitors is to supply bias potentials to said control grids, rather than acting as coupling capacitors of signal voltages. The load resistor R3 has a very high resistive value, so that the electrical path from grid to ground may be considered as practically open; the purpose of said resistor will be described further.

The pairs of tubes V7, V8, and V9, V10 have each a stable operating and a non-operating condition, and accordingly, each pair may be considered as a flip-flop trigger circuit. These two trigger circuits are directly cross coupled with each other in the following manner: The control grid of V9 is directly connected to the first control grid G1 of mixer tube V4, and the control grid of V10 is directly connected to the first control grid G1 of mixer tube V3. Similarly, the control grid of V7 is directly connected to the first control grid G1 of mixer tube V5, and the control grid of V8 is directly connected to the first control grid G1 of mixer tube V10. The parallel-connected second control grids G2 of mixer tubes V3, V4 are normally zero biased with respect to their cathode electrodes, and the parallel-connected second control grids G2 of mixer tubes V5, V6 are normally biased to anode current cut-off, as indicated in the drawing. In this state, assuming that the trigger tube V9 is conducting with a zero bias upon its control grid, the mixer tube V4 becomes conductive, due to the fact that, its first control grid G1 receives direct zero bias from the control grid of V9, and its second control grid G2 is normally biased zero with respect to its cathode electrode. Whereas, the first control grid G1 of mixer tube V3 receives direct cut-off bias from the control grid of non-conducting trigger tube V10. Thus, the mixer tube V4 draws anode current through anode circuit resistor R4, and the negative voltage developed across this resistor is directly applied upon the control grid of trigger tube V7, through bias-acting storage capacitor C6; driving said tube to a non-conducting state, and the trigger tube V8 to a conducting state. With these given operating conditions, the trigger tubes V8, V9 and mixer tube V4 are in conducting states, and the trigger tubes V7, V10 and mixer tubes V3, V5, V6 are in non-conducting states. Assuming now that an incoming marker pulse arrives at the control grid of one of the tubes V1 or V2 (indicating the arrival of a complex waveform to be recorded), the simultaneous negative and positive pulses developed across resistors R1 and R2, respectively (due to operation of either V1 or V2), are applied upon the parallel-connected second control grids G2 of mixer tubes V3, V4, and upon the parallel-connected second control grids G2 of mixer tubes V5, V6, respectively, through coupling capacitors C1 and C2. During this pulse application, the mixer tube V4 becomes non-conductive (mixer tube V3 being already non-conductive), so that these mixer tubes cannot act upon the trigger tubes V7 and V8. Whereas, the mixer tube V6 becomes conductive, having its first control grid zero biased by direct coupling to the control grid of conducting trigger tube V8 (mixer tube V5 remains in non-conductive state due to cut-off bias received directly upon its first control grid G1 from the control grid of non-conducting trigger tube V7), and draws anode current through anode circuit resistor R5, the negative voltage developed across which is directly applied upon the control grid of trigger tube V9; driving it to non-conducting state and the trigger tube V10 to conducting state. At this time, the first control grid G1 of mixer tube V3 receives zero bias by direct coupling from the control grid of conducting trigger tube V10, and the first control grid G1 of mixer tube V4 receives cut-off bias directly from the control grid of non-conducting trigger tube V9. Thus when the incoming pulses subside, and the second control grids G2 of mixer tubes V3, V4 assume zero bias with respect to their cathode electrodes, the mixer tube V3 becomes conductive and draws anode current through anode circuit resistor R6; the negative potential developed across this resistor driving trigger tube V8 to a non-conducting state, and thereby changing states of operation with respect to trigger tube V7. At this time, the first control grid G1 of mixer tube V5 receives zero bias, and the first control grid G1 of mixer tube V6 receives negative cut-off bias, thus preparing for an alternate operation when the following pulses arrive. With these operating conditions given, it is seen that the flip-flop circuit comprising tubes V3 to V10 will change its stable operating condition each time simultaneous negative and positive pulses are impressed upon the control grids G2 of mixer tubes V3, V4 and V5, V6, respectively. These alternate operating states control the alternate operations of the two branches of time based period standardizer.

In reference to the load resistor R3 (connected between grid to ground of V7), and according to the operating conditions of the flip-flop circuit, it is possible that the trigger sections comprising tubes V7, V8, and V9, V10, may be initially set in the wrong operating states when the supply potential of B2 is first switched on. Although the flip-flop circuit will adjust itself instantaneously, due to the cross coupling, it is also possible that the supply potential of B2 may have a high surge potential initially, which will cause the capacitors C3 to C6 (at least two of these capacitors) to charge at a higher potential than the normal potential of battery B2. With such large biases upon the inoperative tubes, the flip-flop circuit cannot adjust itself to proper operating position until said capacitors are discharged to normal value. Since these capacitors have floating connections, it will take a long time before the flip-flop circuit sets itself into operating condition. A resistor R3, however, which is chosen of high value, for example, 8 megohms, will help to neutralize the improper charges across said capacitors, and the flip-flop circuit will reset itself in less than a second after the supply battery B2 is switched on.

*Time base period standardizer*

The first of the two branches of time base period standardizers comprises a storage capacitor C7, for building up time base voltage-waves at some normal time periods; a flyback discharger tube V11 for discharging the storage in capacitor C7; a cathode follower tube V12 for transferring the voltage-wave across high impedance capacitor C7 to a low impedance cathode circuit resistor comprising series-connected resistors R7 to R9; an output storage capacitor C8 for translating the original time base voltage waves into standard time base voltage waves; a flyback discharger tube V13 for discharging the storage in capacitor C8; and a cathode follower tube V14 for transferring the voltage-wave across high impedance capacitor C8 to a low impedance cathode circuit resistor R10. The tubes V15 to V17 act as on-and-off switches for various functions of the time base standardizer.

Since the first and second branches of time base wave standardizers are replicas of each other, both functionally and in component parts, reference will mainly be made to the first branch in describing the function of it. To differentiate the component parts in the drawing, however, like parts are designated by like numerals, with the addition of a suffix to the numerals in the second branch, for example, the storage capacitor C7 in the first branch is designated as C7a of the like part in the second branch. Also, the drawing is made symmetrical with regard to positioning of like parts, for example, the flyback discharger tubes V11 and V11a are positioned in a vertical line in the drawing. Accordingly, further reference to the second branch will not be made in the following specification, except when necessary.

In operation, assume first that the trigger tube V10 has just begun to conduct, and that the tube V9 is being driven to idleness. During this transition period, the sudden removal of current through anode circuit resistor R11 of V9, causes a positive pulse to be transmitted to the control grid of flyback discharger tube V11, by way of a small coupling capacitor C9. The discharger tube V11 (which is normally rendered anode current cut-off by the cut-off bias upon its control grid) becomes conductive suddenly and draws current through capacitor C7; through bias battery B1; and through plate voltage supply battery B2. The high current passing through tube V11 discharges capacitor C7 from a previous storage, and also tends to charge it in the opposite polarity. This depolarized charging, however, is prevented by the parallel-connected diode D1 across capacitor C7. The diode D1 is so polarized that, it normally offers high impedance to the capacitor C7 when charged in series with the diode D2 and resistors R12, R13, but extremely low impedance when charged through discharger tube V11. Thus when V11 becomes conductive and tries to recharge capacitor C7 after discharging it, the high current passing through diode D1 bypasses capacitor C7, and complete discharge is effected in an extremely narrow pulse period, due to the high current passing through V11.

After the transitory period of above mentioned triggering, the negative cut-off bias upon the control grid of trigger tube V9 is directly applied upon the control grids of switch tubes V15 and V16; driving them to idle states. While simultaneously, the zero bias upon the control grid of trigger tube V10 is directly applied upon the control grid of switch tube V17, rendering it conductive and drawing current through series connected resistors R14, R7-R9, and plate supply battery B2; thus producing a negative potential at the anode element of diode D3, so that the storage capacitor C8 will not be charged through diode D3 when a positive voltage is developed across resistors R7-R9 by conduction of cathode follower tube V12. This is made possible by choosing the value of resistor R14 at least ten to twenty times higher than the total value of series connected resistors R7-R9. At this point, the storage capacitor C7 starts charging linearly in series with diode D2, R12 and R13, to the potential of series connected batteries B1 and B3. This rising potential across capacitor C8 is transferred to the cathode circuit resistors R7-R9 of cathode follower tube V12, by direct coupling to the control grid of said tube. The rising positive voltage at the junction terminal of resistors R7 and R8, is now further transferred to the storage capacitor C8, which is charged in series with diode D4 and resistor R15. The RC time constant of storage capacitor C7 and series connected resistors R12, R13 is so adjusted that, the capacitor C7 charges to about 60% (considering only the linear portion of the rise) of the total potential of batteries B1 and B3 during the longest time period in which an arriving complex waveform occurs. The RC time constant of storage capacitor C8 and resistor R15, however, is adjusted much smaller than the former, so that the rising voltage across capacitor C8 follows the rising voltage at junction point of resistors R7 and R8. Accordingly, the recording time base voltage across storage capacitor C8 may be taken either directly, or, from across the cathode resistor R10 of cathode follower tube V14; as represented by the sawtooth wave 1 of the graphical illustration at b.

When the incoming complex waveform terminates and another complex waveform follows, a positive pulse is applied upon the control grid of one of the tubes, V1 or V2, as described in the foregoing, to trigger the flip-flop circuit to an alternate operating condition. After such triggering, the control grids of switch tubes V15a, V16a receive anode current cut-off bias from the control grid of idle trigger tube V10, and the control grid of switch tube V17a receives zero bias from the operating trigger tube V9, so that the capacitor C7a in the second branch starts charging to produce the recording time base wave, which, by further transmittal, is produced across the storage capacitor C8a, for final reproduction across the output cathode circuit resistor R10a of cathode follower tube V14a. As described by way of the first branch, the positive pulse transmitted to the control grid of normally idle discharger tube V11a, through small coupling capacitor C10 during transition period of flip-flop trigger operation, the storage capacitor C7a is discharged from a previous storage for the production of a new time base recording wave. At the same time, however, and in reference to the function of the first branch, the control grids of switch tubes V15, V16 receive zero bias from the control grid of operating trigger tube V9, and the control grid of switch tube V17 receives anode current cut-off bias from the idle trigger tube V10. Also, the control grid of normally idle discharger tube V11 receives a negative pulse through the small coupling capacitor C9, so that the operating condition of discharger tube V11 still remains idle. The anode current of switch tube V15 produces a high negative potential at the junction terminal of resistors R12 and R13, so that the capacitor C7 stops charging and retains the charge that it had assumed at this switched-off instant. Similarly, the anode current of switch tube V16 drops the voltage at the junction terminal between resistor R15 and diode D4 to such a high negative value that the capacitor C8 can no longer charge through diode D4 and resistor R15. But at this time, the idle switch tube V17 has removed the high negative potential from across R14, and because of higher potential is now applied upon the charging capacitor C8, through diode D3 and resistor R14, it keeps on charging. As this additional charging proceeds, current passes through resistor R16 and diode D5. The negative potential developed at the junction terminal between R16 and D5 (by last said current admittance) is applied upon the control grid of amplifier tube V18, through a small coupling capacitor C11. This negative voltage is phase inverted and amplified in the anode circuit resistor R17, which is further applied to the control grid of normally idle discharger tube V13, through coupling capacitor C12. The discharger tube V13 is driven to the threshold of conduction, and starts discharging the capacitor C8, in series with plate supply potential of battery B2. As the charged potential of storage capacitor C8 starts dropping, the current through resistor R16 and diode D5 stops; but the coupling capacitor C11 now transmits the lowered potential of capacitor C8 to the control grid of amplifier tube V18, producing a regenerative positive voltage upon the control grid of discharger tube V13. Because of the high current admittance of discharger tube V13 in series with the high voltage battery B2, the capacitor C8 is discharged at a fast speed. As the discharge is completed, the discharger tube V13 starts charging the capacitor C8 in the reversed polarity. At this time, however, the diode D6 being polarized in forward direction, assumes substantially all the series current that is passing through the discharger tube V13, and therefore, the capacitor C8 becomes completely discharged without depolarization. The potential at the junction terminal of resistor R16 and diode D5 drops to zero, and the control grid of discharger tube V13 assumes its normal current cut-off bias.

With the above given operating conditions, it was seen that the storage capacitor C7 charges linearly to a level where it is switched off, and retains its charge in steady state. This is illustrated in the graphical drawing at a, wherein, wave 7 represents the linear rising charge of capacitor C7, and flat topped portion 8 represents the steady state storage charge of said capacitor. Also, in the graphical illustration at b, the linear saw tooth wave 1 represents the voltage charge across capacitor C8, during the time period of wave 7 in the graphical illustration at a, whereupon, the charge across capacitor C8 is dissipated with a straight line fall. Due to the cathode follower action of tube V12, and therefore the steady state positive potential at its cathode terminal, the capacitor C8 starts charging again (after said discharge) in series with diode D3 and resistor R14. The RC time constant of C8 and R14 is adjusted to a standard time period, so that the rising potential across capacitor is now much speedier than formerly, as shown by the saw tooth waves in the area 2, of the graphical illustration at b; these latter saw tooth waves are the standard reading time base waves. As the rising potential across capacitor C8 reaches the voltage level at the junction terminal between resistors R8 and R9, and exceeds this voltage level, current passes through resistor R16 and diode D5, resulting in the discharge of capacitor C8 in the same manner as just described. Thus it is seen that, during the rising period of storage capacitor C7 the capacitor C8 produces a replica voltage-wave representing the recording time base wave. While during the steady state period of capacitor C7 the capacitor C8 produces standard time base waves having the same amplitude as of the recording time base wave; said standard time base waves representing the reading time base waves.

The purpose of including the resistor R8 is a slight compromise. For example, when the built-up potential across capacitor C8 is too small, the starting potential developed at the junction terminal between resistor R16 and diode D5 may be too small to drive the discharger tube V13 to a conductive state, so that some appreciable time may be required to build up this required potential. Consequently, the amplitude of the reading time base waves may be slightly higher than the recording time base wave. By inclusion of the resistor R8, advance build-up of the required potential at the junction terminal between resistor R16 and diode D5 is obtained. Too great a value of the resistor R8, however, will cause the amplitude of the reading time base waves to be lower than the recording time base wave. This compromise may be reduced negligibly, by increasing the amplification of amplifier tube V18, or, adding more amplifying stages.

The coupling capacitor C11 is preferably chosen of much smaller value than the capacitor C8, so as to reduce loading effect upon the latter during charging time period. Also, the value of loading resistor R18 should be chosen high, but not to a point where too much phase delay may occur of the discharge across coupling capacitor C11 during slow charging period of capacitor C8, so as to avoid time delay of the negative pulse developed across coupling capacitor C11. In one operating device, the values used were: C8=0.001 mfd.; C11=50 mmfd.; and R18=270 K ohms. It will be noted that, at the threshold of conduction of the discharger tube V13, the negative charge that the coupling capacitor C11 had acquired must be discharged through loading resistor R18. This will cause a slight delay of the discharge tube V13 returning to its normal inoperative state after it had discharged the capacitor C8. The discharge of coupling capacitor C11 may be hastened by a loading tube, as in the following:

It was stated in the foregoing that a large amount of current may pass through the discharger tube V13, and consequently through diode D6 when in operation. A small resistor R19, for example, 25 ohms or less, may be connected in series with diode D6, as shown, without appreciably affecting its speed of operation. After the capacitor C8 has been discharged completely, and current starts passing through diode D6 in series with resistor R19, the negative voltage developed across this resistor is applied upon the control grid of amplifier tube V19, through coupling capacitor C13, and amplified across the anode circuit resistor R20 of this tube in phase inverted polarity. This amplified voltage is applied upon the control grid of normally inoperative loading tube V20, through coupling capacitor C14; driving tube V20 conductive. The cathode element of tube V20 is connected to the control grid of amplifier tube V18, and the anode element of V20 is connected to some positive potential, for example, to ground; receiving the positive terminal of the normal bias potential that is applied upon the control grid of amplifier tube V18. When the loading tube V20 becomes conductive, it depolarizes the acquired negative potential of coupling capacitor C11 much faster than it would normally discharge through loading resistor R18, and the discharger tube V13 is removed from its conductive state at a high speed rate. Any depolarized potential that the coupling capacitor C11 may acquire during operation of loading tube V20, will discharge through load resistor R18 during the building of saw tooth wave period.

In the absence of incoming signals, it is possible that the storage capacitor C7 is charged to a high positive potential and retain this charge during the quiescent period. This will impose a steady high current drain upon the cathode follower tube V12. For economy purposes, this current drain may be reduced by imposing self generation of time base waves during said quiescent period. As described in the foregoing, the capacitor C7 is allowed to charge maximum to only about 60% of the total potential of batteries B1 and B3, so as to maintain linearity of the time base wave. Any additional charge above said 60% charge in the capacitor C7, would therefore be considered a quiescent period. A voltage tap at the junction terminal of voltage dividing resistors R21 and R22 is adjusted above said maximum allowed potential in capacitor C7. A diode D7 is then connected between the cathode terminal of cathode follower tube V12 and the last said tap, so polarized that, current flows through diode D7 when the voltage at cathode terminal of V12 is larger than the voltage at said tap; with resultant positive voltage developed at said tap. This positive voltage is applied upon the control grid of tube V21, through coupling capacitor C15, which causes tube V21 to draw enough current for the operation of relay RY1. At the operation of this relay, its armature 9 is shifted from contact 10 to contact 11. The control grid of tube V2 receives a positive potential through contact 11 and armature 9 in series with resistor R23, driving said tube conductive, with the result that, the flip-flop trigger circuit alternates its state of operation; the capacitor C7 becomes discharged; the relay RY1 becomes deenergized; and armature 9 shifts back to contact 10; with a fresh start of charge in capacitor C7. This operation continues on during said quiescent period. Of course, this last operation is not absolutely necessary, and may be dispensed with, if so desired. The use of relay RY1, however, may be utilized advantageously in some applications. For example, as described in my patent application Serial Number 723,510, filed March 24, 1958, relating to the analysis of speech sound waves, a time period having longer time than the longest time period occurring in trains of waves of the propagated speech sound represents a gap between syllables or words. Accordingly, when the circuit arrangement of Fig. 1 is utilized for standardizing the time bases of said wave-trains of the speech sound waves, each operation of the relay RY1 may be interpreted as the arrival of a syllable or a word. The capacitor C16 may be utilized for slowing the repeated operation during long quiescent period, or it may be eliminated, and the repeated operation of said relay distinguished from the long time period that normally takes in pronouncing syllables and words by the vocal system. When self generation of time bases is not utilized, the relay RY1 will energize only once between syllables or words.

With the above given suggestions, it will be readily obvious to the skilled in the art that various modifications, adaptations and substitutions may be made without departing from the spirit and scope of the invention.

What I claim is:

1. The system of translating rising electrical quantities having variable time bases to equally defined rising electrical quantities having a standard time base, the system comprising means for producing pulse waves having variable time bases; means for producing on-and-off switching waves at said variable time bases; means for producing first pulse signals at the start of said on-waves; a potential source; a network comprising a series connected first capacitor, first resistor and a gate coupled to said potential source, so as to effect an increasing electrical quantity across said capacitor in series with the gate and the resistor, said first capacitor and first resistor having a time constant equal to or longer than the longest time period occurring in said variable time bases; a normally inoperative first discharger means for discharging the electrical quantity in said first capacitor; means for applying the on-and-off waves to said gate, and means for applying said first pulse signals to said first discharger means, thereby effecting discharge of said first capacitor while initiating said increasing electrical quantity to the end of said on-wave and retaining thereon the terminated quantity during said off-wave; a second network comprising a second capacitor and a second resistor having a standard time constant equal to or shorter than the shortest time period of said variable time bases; a second normally inoperative discharger means for said second capacitor; a coupling means and means therefor for coupling the electrical quantities produced across said first capacitor to said second network, thereby producing proportional electrical quantities in said second capacitor; means for producing second pulse signals at said standard time base during the periods of said off-waves; and means for applying last said pulses upon said second discharger means for operation of same, thereby discharging said second capacitor in short pulse time periods, so that repeated increasing electrical quantities are produced therein during said off-wave period in substantially equal magnitudes as of the increasing quantities during on-wave periods.

2. The system of translating rising electrical quantities having variable time bases to equally defined rising electrical quantities having a standard time base, the system comprising a source of pulse waves having variable time bases; means for deriving first on-and-off switching waves at time periods corresponding to every second of last said time bases; means for deriving second on-and-off switching waves at time periods corresponding to every other second of last said time bases; means for producing first pulse signals at the start of on-switching waves of said first switching waves; a potential source; a first network comprising a series-connected first capacitor, first resistor and a first gate coupled to said potential source, so as to effect rising electrical quantity across said capacitor in series with the gate and the resistor, at a time constant equal to or longer than the longest time period occurring in said variable time bases; a normally inoperative first discharger means for discharging the electrical quantity in said first capacitor; means for applying the first on-and-off switching waves to said first gate, and means for applying said first pulse signals to said first discharger means, thereby repeatedly producing across said first capacitor said rising electrical quantities during on-switching wave periods, and the peak stored quantities in steady states during off-switching periods of said first waves; a buffer impedance means, and means for coupling the produced electrical quantities in said first capacitor to last said impedance means; an impedance-dividing first tap across last said impedance means; a second network comprising a second capacitor, a second resistor and a second gate, and coupling means therefor for coupling said second network to the produced electrical quantities in said impedance means; a third network comprising said second capacitor, a third resistor and a third gate, and coupling means therefor for coupling said third network to the produced electrical quantities at the impedance-dividing first tap of said buffer impedance means; first adjustment means for adjusting the resistance-capacitance time constant of said third network equal to or shorter than the shortest time period occurring in said variable time bases; second adjustment means for adjusting the resistance-capacitance time constant of said second network to a standard time constant equal to or shorter than the shortest time period occurring in said variable time bases; means for applying said first on-and-off switching waves to said third gate, thereby proportionally transmitting the produced rising electrical quantities in said first capacitor to said second capacitor; means for applying said second on-and-off switching waves to said second gate, thereby proportionally transmitting the produced steady state electrical quantities in said first capacitor to said second capacitor in greater magnitude than the transmission of said rising quantities; a second normally inoperative discharger means for said second capacitor; an impedance-dividing second tap across said second network; a signal producing coupling means between said first and second taps and means therefor for deriving a second signal pulse at the time when the rising electrical quantity at said second tap surpasses the residing electrical quantity at said first tap; and means for applying said second pulse to said second discharger means for discharging said second capacitor, thereby producing in said second capacitor rising quantities at said standard time base in magnitude equal to said transmitted rising quantity from said first capacitor.

3. The system as set forth in claim 2, wherein, said signal producing coupling means comprises a rectifying diode and an impedance means connected in series between said first and second taps, said diode directionally polarized as to respond only when the electrical quantity at said second tap surpasses the electrical quantity at said first tap.

4. The system of translating rising potentials having variable time bases to equally defined rising potentials having a standard time base, the system comprising first and second on-and-off switching waves sequentially interleaved at variable time bases; means for producing first pulse signals at the start of on-switching periods of said first waves; a first potential source; a first network comprising a series-connected first capacitor, first resistor and a first gate coupled to said first potential source, so as to effect rising electrical quantity across said capacitor in series with the gate and the resistor, at a resistance-capacitance time constant equal to or longer than the longest time period occurring in said variable time bases; a second potential source; a first normally inoperative discharger means and coupling means therefor for coupling same to said first capacitor in series with said second potential source, so polarized as to effect discharge of the charge across said first capacitor when said discharger is operated; a first rectifier diode across said first capacitor, so polarized as to prevent depolarized charge in said first capacitor after it has reached its discharged state; means for applying the first on-and-off switching waves to said first gate, and means for applying said first pulse signals to said first discharger means, thereby producing rising potentials during on-switching periods, and the peak stored quantities in steady state during off-switching periods of said first waves; a buffer impedance means and means for coupling the produced potentials in said first capacitor to said impedance means; an impedance-dividing first tap across said impedance means; a second network comprising a second capacitor, a second resistor and a second gate, and coupling means therefor for coupling the produced potentials in said buffer impedance means to said second network; a third network comprising said second capacitor, a third resistor and a third gate, and coupling means therefor for coupling the produced potentials at the impedance-dividing first tap of said impedance means to said third network; first adjustment means for adjusting the resistance-capacitance time constant of said third network equal to or shorter than the shortest time period occurring in said variable time bases; second adjustment means for adjusting the resistance-capacitance time constant of said second network to a standard time constant equal to or shorter than the shortest time period occurring in said variable time bases; means for applying said first on-and-off switching waves to said third gate, thereby proportionally transmitting the produced rising potentials in said first capacitor to said second capacitor; means for applying said second on-and-off switching waves to said second gate, thereby proportionally transmitting the steady state potentials produced in said first capacitor to said second capacitor in greater magnitude than the transmission of said rising potentials; a second normally inoperative discharger means, and coupling means therefor for coupling same to said second capacitor in series with said second potential source, so polarized as to effect discharge of the charge across said second capacitor when last said discharger is operated; a second rectifier diode, and coupling means therefor for coupling last said diode to said second capacitor, so polarized as to prevent depolarized charge in said second capacitor after it has reached its discharged state; an impedance-dividing second tap across said second network; a signal producing coupling means between said first and second taps and means therefor for deriving a second signal pulse at the time when the rising potential at said second tap surpasses the residing potential at said first tap; and means for applying said second pulse to said second discharger means for discharging said second capacitor, thereby producing in said second capacitor rising potentials at said standard time base in magnitude equal to said transmitted rising quantity from said first capacitor.

5. The system as set forth in claim 4, wherein, said signal producing coupling means comprises a third rectifying diode and an impedance means connected in series between said first and second taps, last said diode directionally polarized as to respond only when the potential at said tap surpasses the potential at said first tap.

References Cited in the file of this patent
UNITED STATES PATENTS

| | | |
|---|---|---|
| 2,562,188 | Hance | July 31, 1951 |
| 2,569,164 | Greenwood et al. | Sept. 25, 1951 |
| 2,769,905 | Ropiequet | Nov. 6, 1956 |

UNITED STATES PATENT OFFICE

CERTIFICATE OF CORRECTION

Patent No. 2,942,198            June 21, 1960

Meguer V. Kalfaian

It is hereby certified that error appears in the above numbered patent requiring correction and that the said Letters Patent should read as corrected below.

In the heading to the printed specification, line 3, address of inventor, for "65 E. 96th St.," read 962 Hyperion Ave., --.

Signed and sealed this 3rd day of January 1961.

(SEAL)

Attest:

KARL H. AXLINE
Attesting Officer

ROBERT C. WATSON
Commissioner of Patents